United States Patent
Cerri, III

(10) Patent No.: US 7,510,043 B2
(45) Date of Patent: Mar. 31, 2009

(54) EXHAUST ISOLATOR

(75) Inventor: Joseph F. Cerri, III, Norwalk, OH (US)

(73) Assignee: The Pullman Company, Milan, OH (US)

( * ) Notice: Subject to any disclaimer, the term of this patent is extended or adjusted under 35 U.S.C. 154(b) by 102 days.

(21) Appl. No.: 11/511,664

(22) Filed: Aug. 29, 2006

(65) Prior Publication Data

US 2008/0053737 A1   Mar. 6, 2008

(51) Int. Cl.
*B60K 13/04* (2006.01)
(52) U.S. Cl. .................. 180/296; 180/309; 180/89.2
(58) Field of Classification Search ............. 180/309, 180/312, 296, 89.2; 248/613, 635, 610, 60, 248/621; 267/141.4, 140.13, 219, 26; 403/114, 403/111, 120
See application file for complete search history.

(56) References Cited

U.S. PATENT DOCUMENTS

| | | | | |
|---|---|---|---|---|
| 2,227,306 A * | 12/1940 | Guy | ................ | 248/613 |
| 2,267,431 A * | 12/1941 | Steensen | ............... | 248/60 |
| 2,553,689 A * | 5/1951 | Tuck et al. | ............... | 267/26 |
| 2,869,811 A * | 1/1959 | Boschi | ............... | 267/141.4 |
| 4,063,700 A * | 12/1977 | Brewer | ............... | 248/60 |
| 4,424,960 A * | 1/1984 | Dan et al. | ............... | 267/219 |
| 4,494,722 A * | 1/1985 | Kanai et al. | ............... | 248/621 |
| 4,550,795 A * | 11/1985 | Teshima | ............... | 180/296 |
| 4,638,965 A * | 1/1987 | De Bruine et al. | ............... | 248/610 |
| 4,660,797 A * | 4/1987 | Tonnies | ............... | 248/610 |
| 4,796,841 A * | 1/1989 | Baker et al. | ............... | 248/60 |
| 4,824,056 A * | 4/1989 | Wuebker et al. | ............... | 248/610 |
| 4,893,778 A * | 1/1990 | Drabing et al. | ............... | 248/610 |
| 5,082,252 A * | 1/1992 | Miyamoto | ............... | 267/140.13 |
| 5,127,489 A * | 7/1992 | Takato et al. | ............... | 180/309 |
| 5,507,463 A * | 4/1996 | Kobylinski et al. | ............... | 248/610 |
| 5,673,877 A * | 10/1997 | Karner et al. | ............... | 248/58 |
| 5,908,187 A * | 6/1999 | Kalkoske et al. | ............... | 248/635 |
| 6,402,119 B1* | 6/2002 | Miska | ............... | 248/613 |
| 6,572,070 B2* | 6/2003 | Arciero et al. | ............... | 248/610 |
| 6,739,557 B2* | 5/2004 | Kato | ............... | 248/610 |
| 6,758,300 B2* | 7/2004 | Kromis et al. | ............... | 180/309 |
| 6,851,506 B2* | 2/2005 | Bovio | ............... | 180/296 |
| 6,854,561 B2* | 2/2005 | Bass | ............... | 180/309 |
| 7,261,487 B2* | 8/2007 | Urbach | ............... | 403/114 |

* cited by examiner

*Primary Examiner*—Hau V Phan
(74) *Attorney, Agent, or Firm*—Harness, Dickey & Pierce, PLC

(57) ABSTRACT

An isolator for an engine mount or an exhaust system is designed to be mounted directly into a hole defined by a supporting structure of a vehicle. A rod extends between an elastomeric isolator disposed in the hole and a component of the vehicle being supported.

9 Claims, 4 Drawing Sheets

EXHAUST ISOLATOR

FIELD

The present disclosure relates to a mounting arrangement for an exhaust system of a vehicle. More particularly, the present disclosure relates to an exhaust isolator which is mounted directly to a vehicle's frame or underbody, thus eliminating the need for brackets, bolts, welded frame nuts, clipped in frame nuts or the like.

BACKGROUND

The statements in this section merely provide background information related to the present disclosure and may not constitute prior art.

Typically, automotive vehicles, including cars and trucks, have an internal combustion engine which is coupled to at least a transmission and a differential for providing power to the driven wheels of the vehicle. An engine exhaust system which typically includes an exhaust pipe, a catalytic converter, a muffler and a tail pipe is attached to the engine to quiet the combustion process, to clean the exhaust gases and to route the products of combustion away from the engine. The exhaust system is supported by exhaust mounts or isolators which are positioned between the exhaust system and the frame, the underbody or some other supporting structure of the vehicle's body. In order to prevent engine movement and/or vibrations from being transmitted to the vehicle's body, the exhaust mounts or isolators incorporate flexible mounting members or elastic suspension members to isolate the vehicle's body from the exhaust system.

Typical prior art exhaust mounts or isolators include an upper hanger which is attached to the vehicle's frame or other support structure of the vehicles' body. The upper member extends from the support structure such that it positions an elastomeric isolator at the proper location to accept a lower hanger which extends from the elastomeric isolator to one of the exhaust system's components. The elastomeric isolator is secured in a specific location between the upper hanger and the lower hanger. Typically, the upper hanger includes assembly hardware such as stamped brackets, bolts, welded frame nuts, clip-in frame nuts and/or formed rods which are utilized to secure the upper mount to the frame or other support structure and to secure the elastomeric isolator to the upper mount. This hardware increases the costs and the amount of carbon necessary for the construction and assembly of the vehicle.

SUMMARY

The present disclosure describes an engine mount or isolator which is mounted directly to the vehicle's frame or other support structure of the vehicle's body. The direct attachment of the exhaust mount or isolator eliminates the need for the upper bracket and all of the associated hardware. The exhaust mount or isolator can be fit directly within a hole formed in the support structure. The elastomeric portion of the exhaust mount or isolator includes a hole which accepts a support rod or lower hanger which is attached to the component of the exhaust system. The support rod or lower hanger can be formed to position the component of the exhaust system in the desired location.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
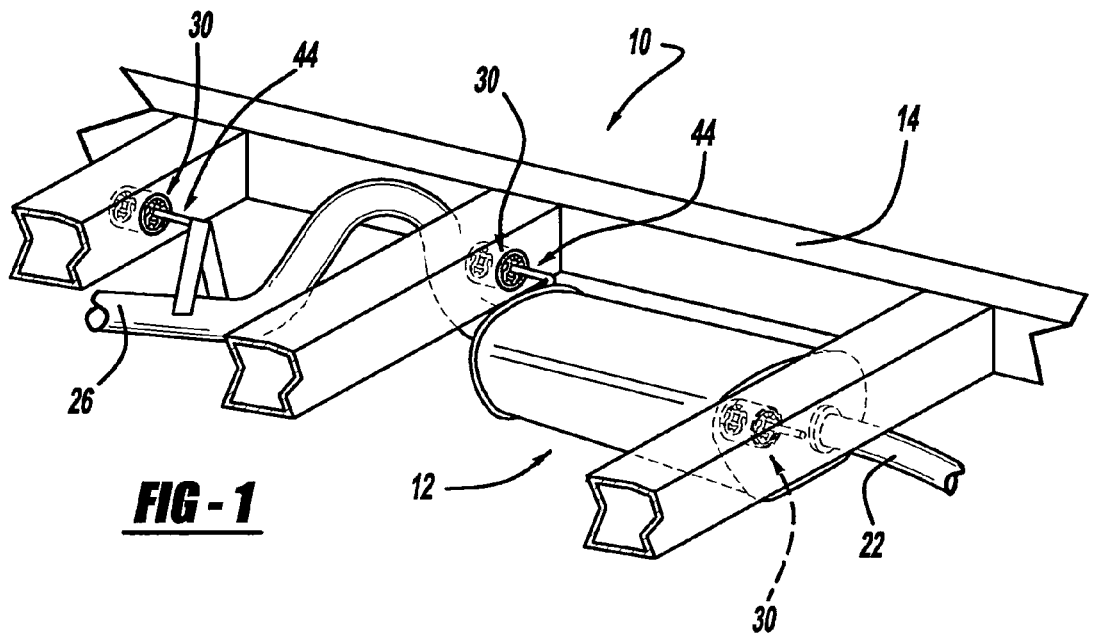
FIG. 1 is a perspective view of an exhaust system attached to a support structure of a vehicle with exhaust isolators in accordance with the present disclosure.

The following description is merely exemplary in nature and is not intended to limit the present disclosure, application, or uses. There is shown in FIG. 1, an exhaust mounting system in accordance with the present disclosure which is identified generally by the reference numeral 10. Exhaust mounting system 10 attaches an exhaust system 12 to a support structure 14 of a vehicle. The vehicle includes an internal combustion engine (not shown), an unsprung mass including wheels and a suspension system (not shown) and a sprung mass which includes a vehicle body (not shown) which is supported by support structure 14. Exhaust system 12 is connected to the engine of the vehicle and exhaust system 12 routes the products of combustion of the engine to the rear of the vehicle. The internal combustion engine powers the wheels of the vehicle through a transmission (not shown) and a differential (not shown).

Exhaust system 12 comprises an intermediate pipe 22, a muffler 24, a tailpipe 26 and a plurality of exhaust isolator assemblies 30. Intermediate pipe 22 is typically connected to a catalytic converter (not shown) which is connected to an exhaust pipe (not shown) which is in turn connected to an exhaust manifold (not shown) which is one of the components of the vehicle's internal combustion engine. The catalytic converter may be connected to a single exhaust pipe which leads to a single exhaust manifold or the catalytic converter can be attached to a branched exhaust pipe which leads to a plurality of exhaust manifolds. Also, intermediate pipe 22 can be connected to a plurality of catalytic converters which connect together prior to reaching muffler 24 using a branched intermediate pipe 22 or the vehicle can have a plurality of exhaust manifolds, connected to a plurality of exhaust pipes, connected to a plurality of catalytic converters, connected to a plurality of intermediate pipes, connected to a plurality of mufflers, connected to a plurality of exhaust pipes. The present disclosure is applicable to the above described exhaust systems as well as any other exhaust system known in the art.

Exhaust system 12 is utilized to route the exhaust gases from the vehicle's engine to the rear area of the vehicle. While traveling from the engine to the rear of the vehicle through exhaust system 12, the catalytic cleaner cleans the exhaust gases and muffler 24 quiets the noises associated with the combustion process of the vehicle's engine. Exhaust isolator assemblies 30 provide for the support of exhaust system 12 underneath the vehicle and they operate to prevent engine movement and vibrations from being transmitted to the vehicle's body. In addition, exhaust isolator assemblies 30 provide proper positioning and alignment for exhaust system 12 during assembly of exhaust system 12 and during the operation of the vehicle.

Figure 2:
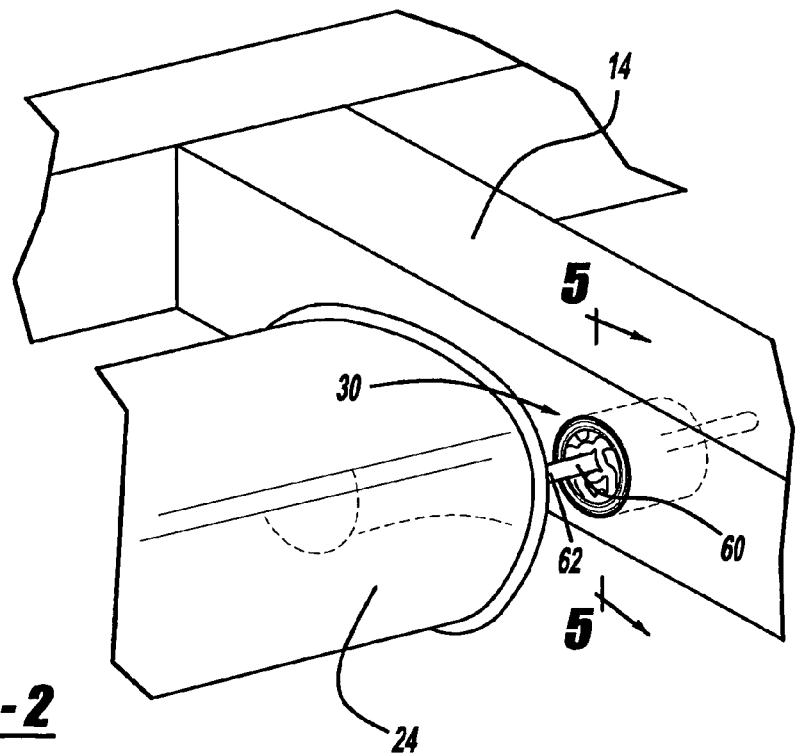
FIG. 2 is an enlarged perspective view of one of the exhaust isolators illustrated in FIG. 1.
Figure 3:
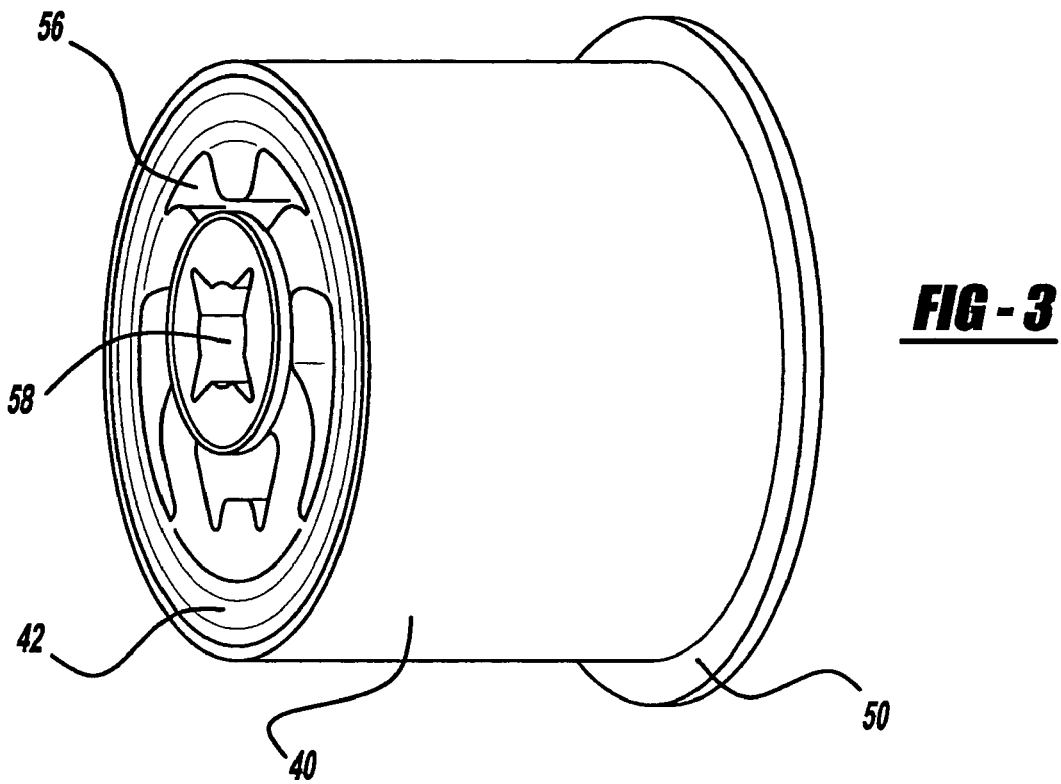
FIG. 3 is a perspective view of the exhaust isolator illustrated in FIGS. 1 and 2.
Figure 4:
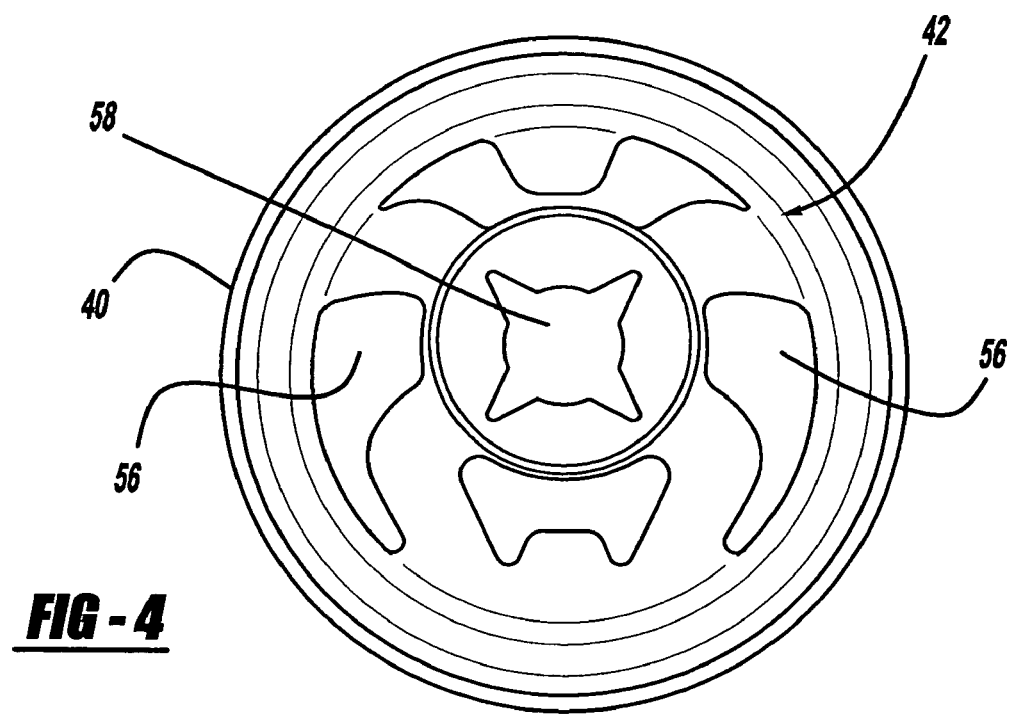
FIG. 4 is an end view of the exhaust isolator illustrated in FIG. 3.
Figure 5:
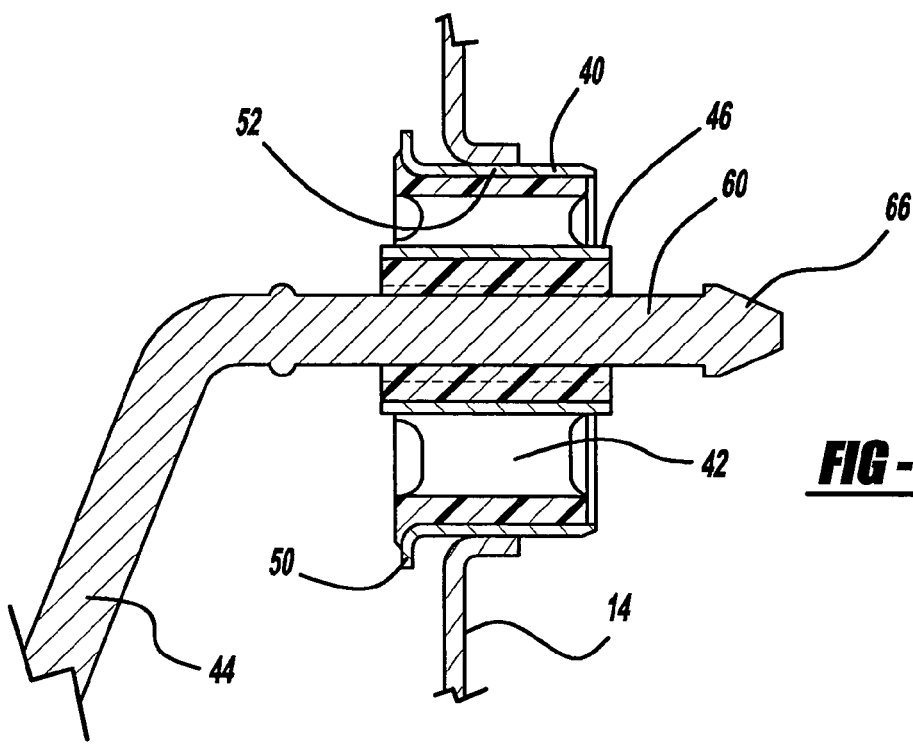
FIG. 5 is a cross-sectional view of the exhaust isolator illustrated in FIGS. 1-4 with a support rod or lower hanger assembled.

Referring now to FIGS. 2-5, exhaust isolator assembly 30 comprises an exterior housing or sleeve 40, an elastomeric isolator 42, an exhaust rod 44 and an internal sleeve 46. Exterior housing or sleeve 40 and internal sleeve 46 are both a drawn steel sleeve, a plastic sleeve or any other type of sleeve known in the art. Exterior housing or sleeve 40 includes a flange 50 which facilitates the press-fitting or assembly of exterior housing or sleeve 40 into the vehicle. Exterior housing or sleeve 40 is designed to be press-fit into a closed circular aperture 52 defined by a closed circular circumferential edge of a planar wall of a single component of support structure 14 of the vehicle (a planar wall of cross-member as illustrated in FIGS. 1, 2 and 5). Press-fitting of exterior housing or sleeve 40 directly into aperture 52 defined by support structure 14 eliminates the typical hardware associated with mounting the prior art exhaust isolators. Exterior housing or sleeve 40 may be pressed into aperture 52 mechanically, hydraulically or pneumatically. This press-fit operation can be conducted during vehicle assembly, it can be conducted during manufacture of support structure 14 or at any time convenient to the vehicle's manufacturer. While exterior housing or sleeve 40 is illustrated as being a circular cylindrical shape, it is within the scope of the present invention to have exterior housing or sleeve 40 be any shape which is desired by the vehicle's manufacturer.

Elastomeric isolator 42 is a circular cylindrical body disposed within exterior housing or sleeve 40 by being press fit, chemically bonded or secured to exterior housing or sleeve 40 by any other means known in the art. Elastomeric isolator 42 can be formed from silicone (typical for high temperature applications), EPDM (ethylene-propylene-diene-monomer) (typical for moderate temperature applications), natural rubber (typical for low temperature applications) or any other elastomer which meets the requirements of the application. Internal sleeve 46 is typically molded into elastomeric isolator 42. Elastomeric isolator 42 defines a plurality of voids 56 which define a plurality of ribs, the plurality of voids 56 are engineered in size, shape and location to control the dynamic rate of exhaust isolator assembly 30, the insertion force for exhaust isolator assembly 30, the system durability requirements for exhaust isolator assembly 30 as well as other developmental and performance characteristics for exhaust isolator assembly 30. Elastomeric isolator 42 defines a through bore 58 through which exhaust rod 44 is inserted during the installation of exhaust system 12.

Exhaust rod 44 is a formed rod which can include compound bends such that a first end 60 is positioned to axially engage bore 58 and a second end 62 is designed to mate with and be secured to a component of exhaust system 12. As illustrated, a different exhaust rod 44 is used for each exhaust isolator assembly 30 but it is within the scope of the present invention to utilize as many common exhaust rods 44 as the design of the specific application allows. Also, each exhaust rod 44 is designed such that each first end 60, which axially engages a respective bore 58, is designed such that they engage their respective bore 58 in the fore/aft direction of the vehicle. This fore/aft arrangement of all of exhaust rods 44 simplifies the assembly of exhaust system 12 into vehicle 10.

Typically, exhaust rods 44 will each be attached to their respective component of exhaust system 12. Exhaust system 12 is properly positioned below the vehicle and each exhaust rod 44 is aligned with its respective bore 58 either individually or simultaneously. Exhaust rods 44 are inserted into bores 58 to complete the assembly of exhaust system 12 onto the vehicle. The fore/aft arrangement of all of support rods 44 simplifies this assembly process. An annular barb 66 is formed on the end of each exhaust rod 44 to resist the removal of exhaust rod 44 from its respective bore 58.

Figure 6:
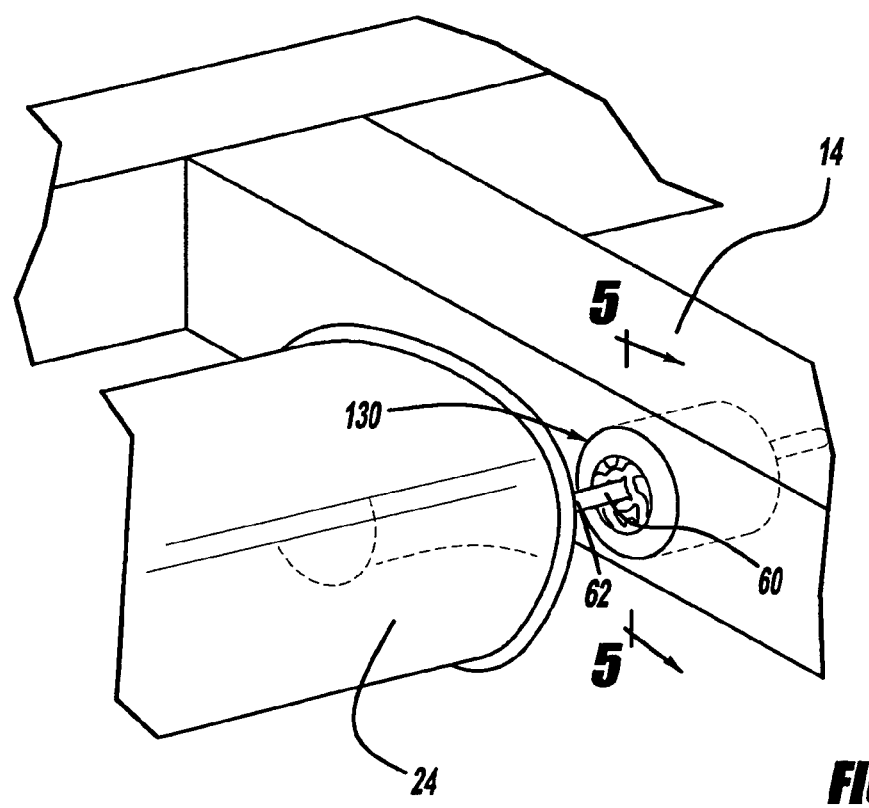
FIG. 6 is an enlarged perspective view similar to FIG. 2 but illustrating an exhaust isolator in accordance with another embodiment of the present invention; and, FIG. 7 is a cross-sectional view of the exhaust isolator illustrated in FIG. 6 with a support rod or lower hanger assembled.
Figure 7:
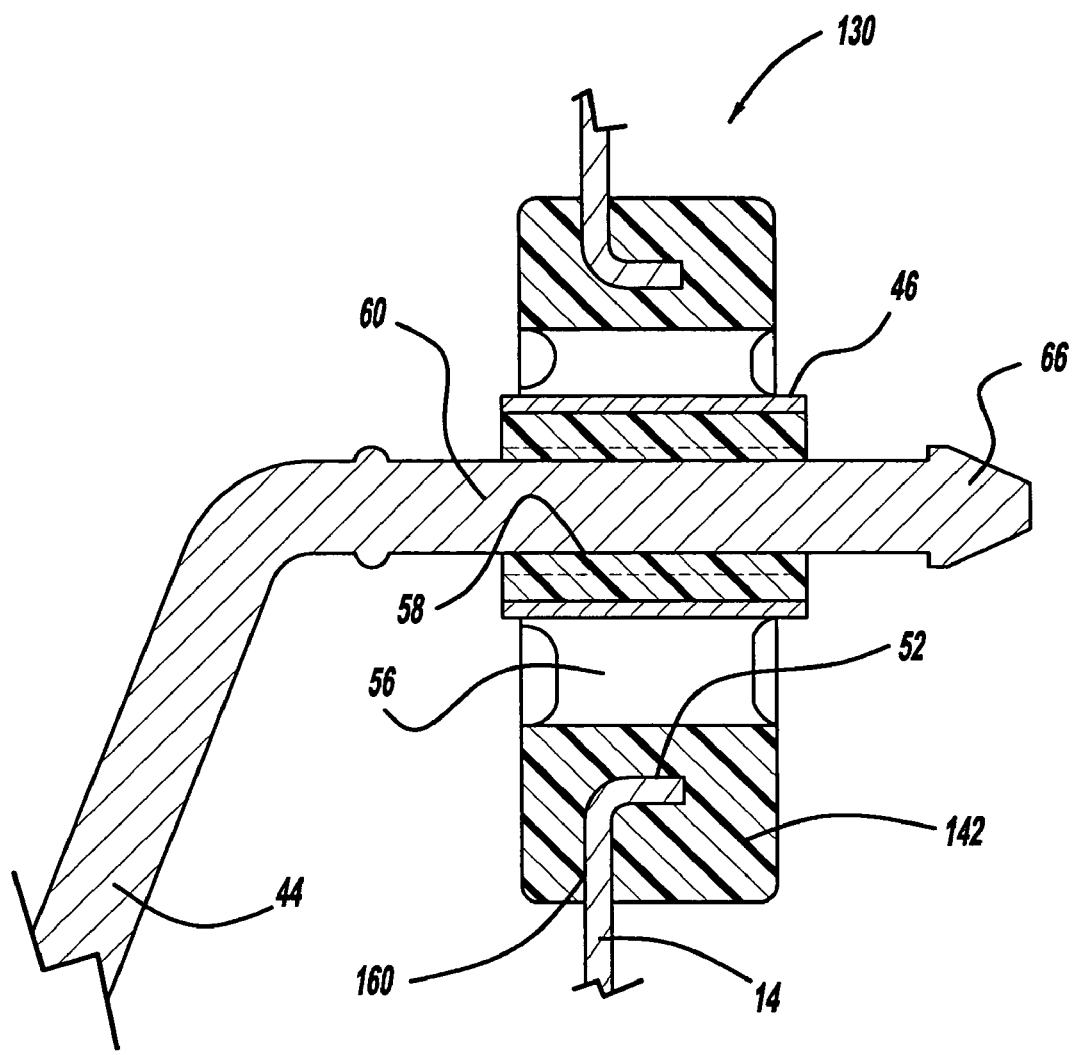

Referring now to FIGS. 6 and 7, an exhaust isolator assembly 130 in accordance with another embodiment of the disclosure is illustrated. Exhaust isolator assembly 130 comprises elastomeric isolator 142 and exhaust rod 44. Elastomeric isolator 142 is the same as elastomeric isolator 42 except that elastomeric isolator 142 is designed to be secured directly to support structure 14 thus eliminating the need for exterior housing or sleeve 40.

Elastomeric isolator 142 is disposed within aperture 52. Elastomeric isolator 142 includes internal sleeve 46 and it defines an annular slot 160 which mates with the surrounding structure forming aperture 52. Elastomeric isolator 42 can be fit within aperture 52, press fit within aperture 52, chemically bonded to support structure 14 or secured to support structure 14 by any other means known in the art. Elastomeric isolator 142 can be formed from silicone (typical for high temperature applications), EPDM (ethylene-propylene-diene-monomer) (typical for moderate temperature applications), natural rubber (typical for low temperature applications) or any other elastomer which meets the requirements of the application. Elastomeric isolator 142 defines the plurality of voids 56 which are engineered in size, shape and location to control the dynamic rate of exhaust isolator assembly 130, the insertion force for exhaust isolator assembly 130, the system durability requirements for exhaust isolator assembly 130 as well as other developmental and performance characteristics for exhaust isolator assembly 130. Elastomeric isolator 142 defines the through bore 58 through which exhaust rod 44 is inserted during the installation of exhaust system 12.

Exhaust isolator assembly 130 can be utilized in place of exhaust isolator assembly 30 at any one or all of the locations which support exhaust system 12. The performance and advantages described above for exhaust isolator assembly 30 apply also to exhaust isolator assembly 130.

What is claimed is:

1. An isolator in combination with a supporting structure for a vehicle body of a vehicle and an exhaust system of the vehicle, the isolator comprising:
    an elastomeric isolator disposed within a closed aperture defined by a planar wall of said supporting structure; and
    an exhaust rod having a first end connected to said elastomeric isolator, a second end of said exhaust rod being attached to a component of said exhaust system.

2. The isolator according to claim 1, wherein said elastomeric isolator defines a hole within which said rod is disposed.

3. The isolator according to claim 2, wherein said elastomeric isolator includes a central portion defining said hole, an outer portion engaging said supporting structure and a plurality of voids disposed between said central portion and said outer portion.

4. The isolator according to claim 1, further comprising an exterior housing disposed between said elastomeric isolator and said supporting structure.

5. The isolator according to claim 4, wherein said elastomeric isolator defines a hole within which said rod is disposed.

6. The isolator according to claim 5, wherein said elastomeric isolator includes a central portion defining said hole, and outer portion engaging said exterior housing and a plurality of voids disposed between said central portion and said outer portion.

7. The isolator according to claim 1, wherein said supporting structure is a cross-member.

8. The isolator according to claim 1, wherein said closed aperture is defined by a closed circular circumferential edge of a single component of said supporting structure.

9. The isolator according to claim 1, wherein said elastomeric isolator is a circular cylindrical body and said closed aperture is a closed circular aperture.

* * * * *